US010404749B2

(12) United States Patent
Lock et al.

(10) Patent No.: US 10,404,749 B2
(45) Date of Patent: Sep. 3, 2019

(54) ENFORCING APPLICATION SECURITY REQUIREMENT RULES USING SECURITY ANNOTATIONS

(71) Applicant: SAP SE, Walldorf (DE)

(72) Inventors: Hendrik C. R. Lock, Linkenheim-Hochstetten (DE); Iouri Loukachev, Heilbronn (DE)

(73) Assignee: SAP SE, Walldorf (DE)

( * ) Notice: Subject to any disclaimer, the term of this patent is extended or adjusted under 35 U.S.C. 154(b) by 107 days.

(21) Appl. No.: 15/339,454

(22) Filed: Oct. 31, 2016

(65) Prior Publication Data

US 2018/0124113 A1 May 3, 2018

(51) Int. Cl.
*H04L 29/06* (2006.01)
(52) U.S. Cl.
CPC ............ *H04L 63/20* (2013.01); *H04L 63/105* (2013.01)
(58) Field of Classification Search
CPC ......... H04L 63/20; H04L 63/08; H04L 63/10; H04L 67/34; H04L 63/105; H04W 12/08
See application file for complete search history.

(56) References Cited

U.S. PATENT DOCUMENTS

| 8,386,998 | B2 | 2/2013 | Satoh et al. |
| 8,732,094 | B2 | 5/2014 | Rosa et al. |
| 2009/0099860 | A1 | 4/2009 | Karabulut et al. |
| 2009/0099882 | A1 | 4/2009 | Karabulut |
| 2010/0319002 | A1 | 12/2010 | Gosain et al. |
| 2013/0097318 | A1* | 4/2013 | Gladstone ........... H04L 63/0272 709/226 |
| 2014/0351272 | A1* | 11/2014 | Kemmler .............. G06F 16/217 707/752 |
| 2014/0359774 | A1* | 12/2014 | Pulapaka ................ G06F 21/50 726/24 |
| 2016/0021064 | A1 | 1/2016 | Lock et al. |

OTHER PUBLICATIONS

Content Security Policy from OWASP, downloaded on Oct. 21, 2016 from: URL: https://www.owasp.org/index.php/Content_Security_Policy (6 pages).

* cited by examiner

*Primary Examiner* — Yogesh Paliwal
(74) *Attorney, Agent, or Firm* — Jones Day

(57) ABSTRACT

Systems and methods are provided for enforcing security requirement rules of an application. A security guard retrieves security annotations associated with an application from a server. Each security annotation is mapped to a security requirement rule. Based on the evaluated application compliance with the security requirement rules, an executable interpretation of the corresponding security requirement rule is implemented.

20 Claims, 3 Drawing Sheets

ENFORCING APPLICATION SECURITY REQUIREMENT RULES USING SECURITY ANNOTATIONS

TECHNICAL FIELD

The subject matter described herein relates to the enforcement of security requirement rules between applications using security annotations.

BACKGROUND

As companies continue to move towards electronic based work environments, application security requirements continue to become more strict. The security of an application depends on many factors. With a variety of web browsers and mobile device applications on the market, company applications, in some cases, are required to comply with various security requirement rules related to each specific application in order to access a particular service.

Some security requirement rules can be addressed by measures taken during the development process such as secure coding. Other security requirement rules can depend on runtime features such as server configuration, application configuration, browser settings and/or settings of the underlying operating system. With the ongoing parallel development of applications, there is minimal guarantee of consistency between possible application and service combinations. For an administrator or end user, it is often difficult and/or expensive to gain an overview and an understanding of all security requirement rules for each individual application.

SUMMARY

In one aspect, a plurality of security annotations associated with an application are retrieved by a security guard from a server. Retrieval of the security annotations can occur either upon authentication of the application, prior to a request by the application to access one or more resources on a server or during the request by the application to access the one or more resources on the server. Each security annotation is mapped by the security guard into a security requirement rule. The security guard evaluates compliance of the application with the plurality of security requirement rules. In some variations, the security guard can belong to an application layer and cannot be circumvented by the application layer. Based on the evaluated compliance, one or more security implications are implemented by the security guard. Each security implication is an executable interpretation of the corresponding security requirement rule. The enforcement of security requirement rules can occur within an in-memory database.

Implementation of a security implication, for example, can cause actions such as stopping the application, denying access of the application to the server, denying entity set access, denying access of the application to data of specific properties, or denying the application read, write, modify, or delete permissions.

The plurality of security annotations can be categorized as either a service annotation or an application annotation. The plurality of security annotations can also be categorized as either fundamental security requirement rules or variable security requirement rules. A security annotation can be based on static or dynamic metadata and can be associated with at least one of a service level, an entity set level, and a property level.

In one variation the plurality of security requirement rules can be encoded by the security guard prior to retrieving the plurality of security annotations. In other variations, the plurality of security requirement rules can be loaded from the server upon initiation of the security guard and subsequently interpreted by the security guard.

In another aspect, a non-transitory computer readable medium contains program instructions. Execution of the program instructions by at least one data processor results in operations that include a security guard retrieving a plurality of security annotations associated with an application from a server. Each security annotation is mapped by the security guard into a security requirement rule. The security guard evaluates compliance of the application with the plurality of security requirement rules. Based on the evaluated compliance, one or more security implications are implemented. Each security implication is an executable interpretation of the corresponding security requirement rule.

In yet another aspect, a system includes at least one data processor, an in-memory database, and memory storing instructions stored in the in-memory database. Execution of the memory-storing instructions by at least one data processor results in operations that include a security guard retrieving a plurality of security annotations associated with an application from a server. Each security annotation is mapped by the security guard into a security requirement rule. The security guard evaluates compliance of the application with the plurality of security requirement rules. Based on the evaluated compliance, one or more security implications are implemented. Each security implication is an executable interpretation of the corresponding security requirement rule. The enforcing security requirement rules can occur within an in-memory database.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. One technical advantage includes the ability to develop a generic security application layer that interprets and enforces security requirement rules for a plurality of applications based on security annotations. A one-time implementation of a generic security layer allows for flexibility to maintain application use of a plurality of different applications without needing to modify the application to comply with a plurality of security requirement rules.

The details of one or more variations of the subject matter described herein are set forth in the accompanying drawings and the description below. Other features and advantages of

DETAILED DESCRIPTION

Figure 1:
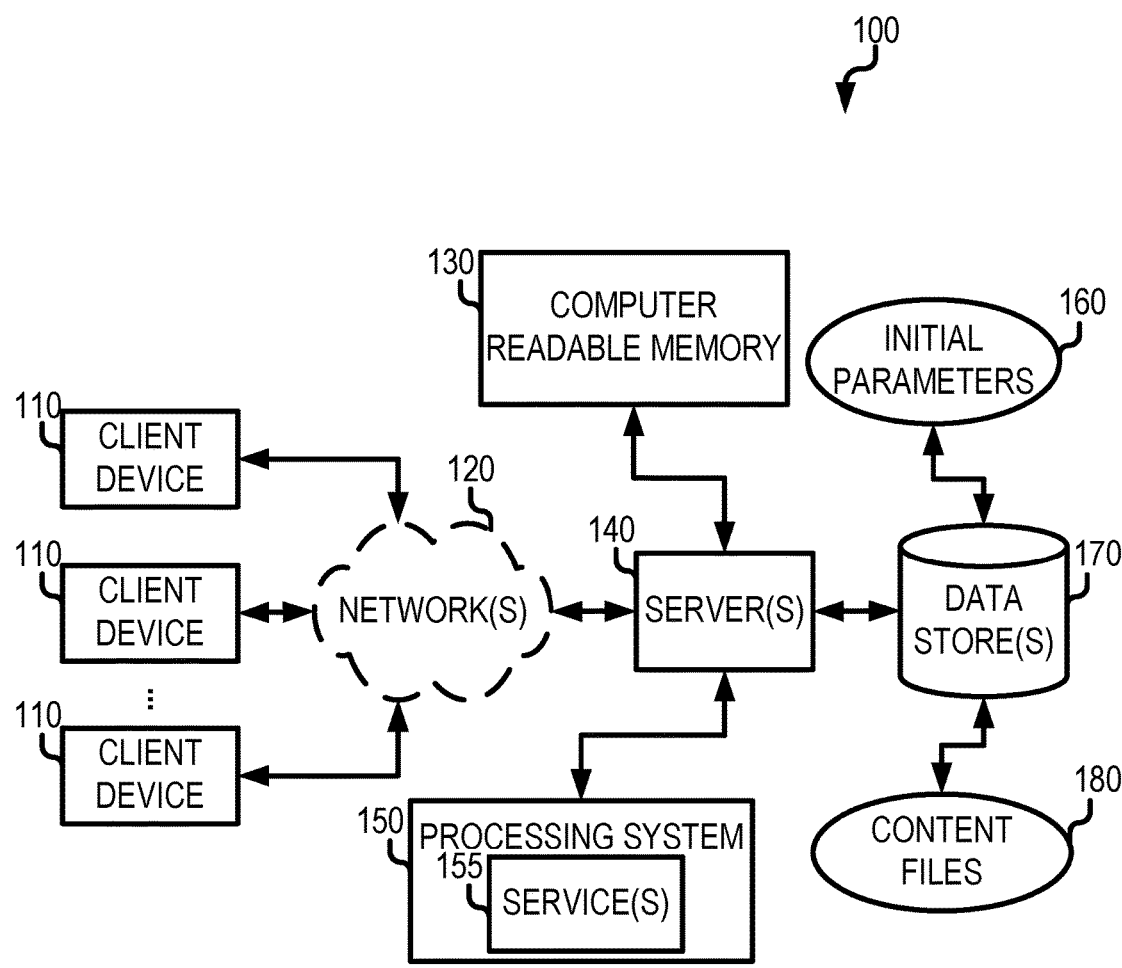
FIG. 1 is a diagrammatic depiction of an example implementation system of a client-server architecture.

FIG. 1 is a diagrammatic depiction of an example implementation system 100 of a client-server architecture. One or more client devices 110 access one or more servers 140 running one or more services 155 on a processing system 150 via one or more networks 120. Alternatively, client device 110 and server 140 can be the same computing device eliminating the need for network 120. One or more servers 140 can access computer-readable memory 130 as well as one or more data stores 170. One or more data stores 170 can include initial parameters 160 as well as content files 180.

Figure 2:
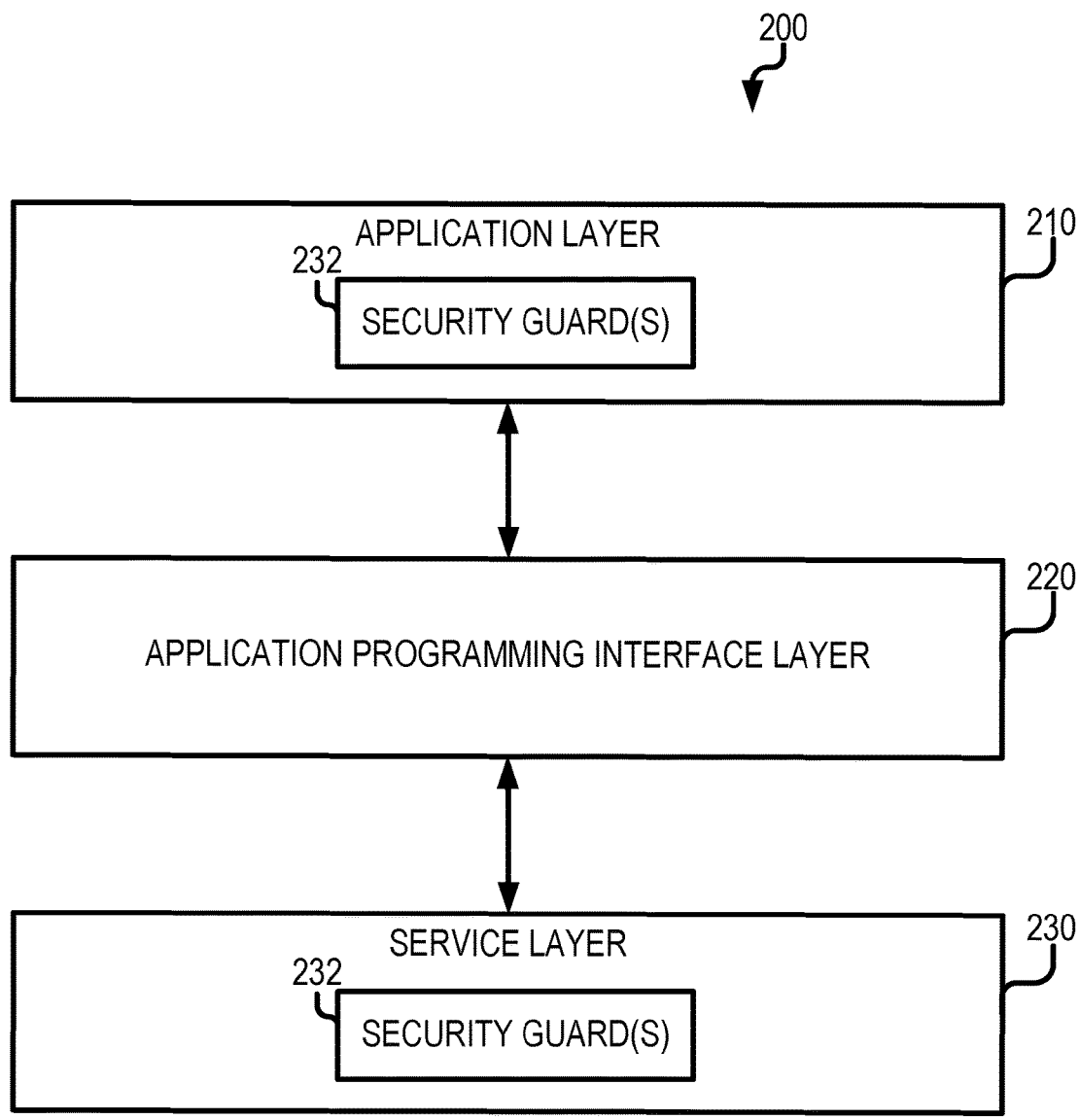
FIG. 2 is a block diagram depicting an example system architecture enforcing application security requirement rules using security annotations.

FIG. 2 is a block diagram depicting an example system architecture 200 for enforcing application security requirement rules using security annotations. System architecture 200 can operate on one or more client devices 110 and/or one or more servers 140. System architecture 200 can include application layer 210, Application Programming Interface (API) layer 220, and service layer 230. One or more security guards 232 can belong to application layer 210 such that application layer 210 cannot bypass the one or more security guards 232. Service layer 230 can also include one or more security guards 232. One or more security guards 232 can implement and interpret security requirement rules associated with application layer 210 and/or service layer 230. Metadata can be used for representing security requirement rules.

Application layer 210 can communicate via API layer 220 to service layer 230 using, for example, a data transfer protocol and/or Asynchronous JavaScript and Extensive Markup Language (XML) (AJAX). AJAX can include a plurality of website development tools including, but not limited to, HyperText Markup Language (HTML), Cascading Style Sheets (CSS), Document Object Model, XML, XMLHttpRequest and/or JavaScript.

One or more security guards 232 can be defined generically such that definition of security requirement rules happens once, independently of each application. This can happen before deployment of application layer 210, i.e., during application development. Alternatively, one or more security guards 232 can be independently deployed and used through API layer 220. Enforcement of security requirement rules creates a corresponding annotation for security annotations associated with application layer 210 and/or service layer 230.

Application layer 210 can be developed to consume data within service layer 230. Service layer 230 can be security sensitive such that its contents can be restricted to only privileged access. Application layer 210 can access a security sensitive service protected at least during communication via network 120 by using, for example, Hypertext Transfer Protocol Secure (HTTPS) or dedicated encryption content.

Security requirement rules corresponding to accessibility of service layer 230 can be encoded into one or more security guards 232. A security guard 232 can exist for different application layers being used. The security requirement rules of application layer 210 can be dependent upon, for example, client device technology or website browser type. Security requirement rules can occur in a body of a request or a response. Service layer 230 and/or application layer 210 can be associated with appropriate security annotations that fulfill the security requirement rules to allow communication of application layer 210 with service layer 230 via API layer 220.

Figure 3:
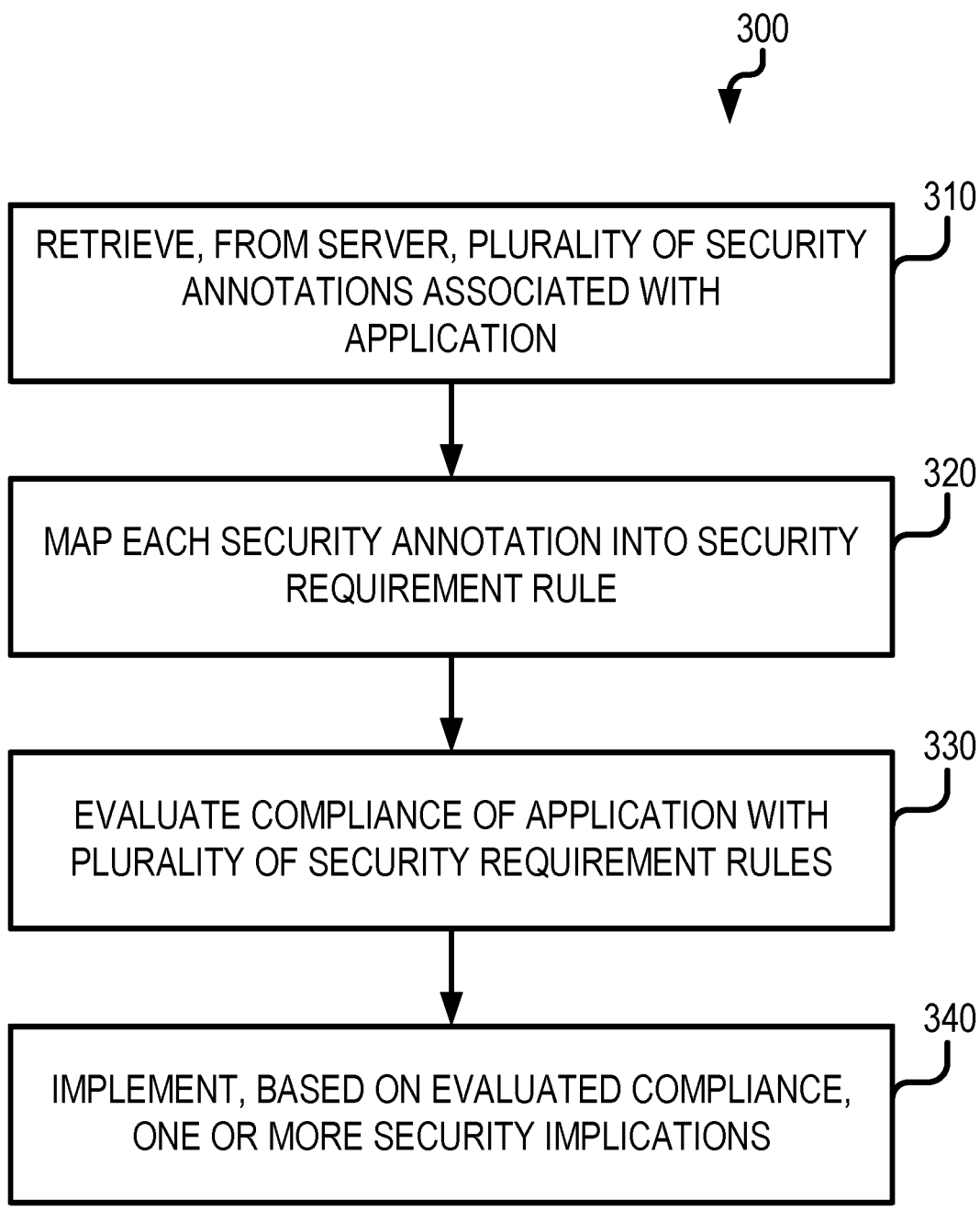
FIG. 3 is a process flow diagram illustrating enforcement of application security requirement rules using security annotations.

FIG. 3 is a process flow diagram 300 illustrating the enforcement of application security requirement rules using security annotations. A plurality of security annotations associated with an application can be retrieved, at 310, from a server. In one example, security annotations can be retrieved upon authentication of an application. Security annotations can also be retrieved prior to a request by application layer 210 to access service layer 230 and/or during the request by application layer 210, i.e., during the lifetime session of application layer 210. Retrieval can be done, for example, through the metadata of a data transfer protocol such as Open Data Protocol (ODATA). Alternatively, such a request can be made through an annotation file. The server can be the same computing device that hosts the application. Alternatively, the server can be a different computing device.

Security annotations can be separated into two different types: service annotations and application annotations. Service annotations can be security requirement rules associated with the data service channel. Application annotations can be security requirement rules associated with an application. The security annotations can be static or dynamic. Security annotations provide the ability to change the meaning of a selected service over time or over the location without changing the service itself.

Each security annotation can be mapped, at 320, into a security requirement rule. A security implication can be encoded as an executable interpretation of the security requirement rule within the security guard 232. Compliance of application layer 210 with each of a plurality of security requirement rules can be evaluated, at 330. Security requirement rules can be encoded by the security guard prior to initiation of an application. Encoding of the security requirement rules within the security guard can prohibit manipulation of the rules. Additionally, encoded rules can be deployed by other applications and can be updated in a controlled manner. Alternatively, the security requirement rules can be content loaded from a server when the application is initiated and subsequently interpreted by the security guard.

Security requirement rules can be associated with one or more security annotations of, for example, an HTTPS resource or service. A security requirement rule can be associated with any other condition of application layer 210 or its resources. In one example, HTTPS can be used when accessing an ODATA service and can wrap a "get" method within a batch request.

Upon determining compliance with at least one of the plurality of security requirement rules, the security guard can alter the behavior of the application by implementing, at 340, the security implications corresponding to the security annotation. The security implication being an executable interpretation of the security requirement rule. Alterations of application behavior can include, for example, sending only secure HTTPS requests, using batch requests which protect the content in a request Uniform Resource Identifier (URI), encrypting the sensitive data in a query section of a URI request, revoking the sending of requests at AJAX when specific data fields are used in the request or response, halting the execution of the application and providing an error when a violation is detected, denying sending requests for specific services for specified value combinations, switching on and off Global Positioning System (GPS) sampling data, and/or logging the information regarding the request.

In an example, if the properties "Customer Code" and "PharmaceuticalProductID" are in the same security annotation then both the entity set level and the property level have a security condition of "sensitive." The security annotation can be a select statement inside a URI. The security annotation can also be an entity level type or denote occurrence in the URI itself.

In another example, a further security requirement rule can express that sensitive entities should be protected such as when a browser is of a version that is not supported. In this case, the application can be inhibited from accessing a service if the application browser is of an unsupported version.

In yet another example, a security requirement rule can specify that only text files are allowed in a response. In this case, the security annotation could be customized to ensure only the allowed responses are provided.

Security requirement rules can be separated into fundamental security requirement rules and variable security requirement rules. Fundamental security requirement rules can be evaluated for compliance once. Alternatively, variable security requirement rules can be evaluated each time the security guard evaluates compliance with the plurality of security requirement rules. Reuse of such security requirement rules can happen by quoting the annotations.

Once executed, the security annotation can be associated with the service and stored within the security guard. Annotations can be associated to the service level, entity set level, and/or to the property level. A static annotation can be incorporated into the metadata of a service. Alternatively, a dynamic annotation can be incorporated into a payload of a document in a server response. The dynamic annotation can be computed dynamically when creating a server response.

Some example security implications can include stopping the application, denying access of the application to the server, denying entity set access, denying access of the application to data of specific properties, denying the application read permissions, denying the application write permissions, denying the application modify permissions, denying the application delete permissions. When a security implication is stopping application layer 210, for example, execution of an exit statement can terminate operations of application layer 210. In the event the security requirement rules cannot be met, access of the application to the service can be inhibited upon termination of application layer 210. Additionally, upon termination, an error message can be displayed to the end user (i.e., "The setup is unsecure, your application cannot start. Please contact your administrator.").

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method for enforcing security requirement rules of applications being implemented by one or more data processors forming part of at least one computing device, the method comprising:
    retrieving, by a security guard, a plurality of security annotations associated with each of the applications from a server, wherein the security annotations differ for at least two of the applications;
    determining, by the security guard for each application, a plurality of security requirement rules, each security requirement rule based on a corresponding security annotation of the plurality of security annotations;
    evaluating, by the security guard for each application, compliance of such application with the plurality of security requirement rules; and
    implementing, based on the evaluated compliance for each application, one or more security implications, wherein each security implication is an executable interpretation of the corresponding security requirement rule,
    wherein the security guard belongs to an application layer and cannot be circumvented by the application layer and wherein at least one of the security annotations comprises a defined data service channel.

2. The method according to claim 1, wherein, for each application, retrieving the plurality of security annotations occurs either upon authentication of the application, prior to a request by the application to access one or more resources on the server, or during the request by the application to access the one or more resources on the server.

3. The method according to claim 1, wherein the plurality of security requirement rules are encoded by the security guard prior to retrieving the plurality of security annotations.

4. The method according to claim 1, wherein the plurality of security requirement rules are loaded from the server upon initiation of the security guard and subsequently interpreted by the security guard.

5. The method according to claim 1, wherein the plurality of security annotations are each categorized as either a service annotation or an application annotation.

6. The method according to claim 1, wherein, for each application, the plurality of security annotations are each categorized as either fundamental security requirement rules evaluated on initiation of the application or variable security requirement rules evaluated each time the security guard evaluates compliance.

7. The method according to claim 1, wherein, for each application, implementing the security implication results in at least one of stopping the application, denying access of the application to the server, denying entity set access, denying access of the application to data of specific properties, denying the application read permissions, denying the application write permissions, denying the application modify permissions, and denying the application delete permissions.

8. The method according to claim 1, wherein each security annotation is based on static or dynamic metadata.

9. The method according to claim 1, wherein each security annotation is associated with at least one of a service level, an entity set level, and a property level.

10. The method according to claim 1, wherein wherein enforcing security requirement rules occurs in an in-memory database.

11. A system for enforcing security requirement rules of applications, the system comprising:
    at least one data processor;
    an in-memory database; and
    memory storing instructions stored in the in-memory database, which when executed by at least one data processor, result in operations comprising:
        retrieving, by a security guard, a plurality of security annotations associated with the application from a server;
        retrieving, by a security guard, a plurality of security annotations associated with each of the applications from a server, wherein the security annotations differ for at least two of the applications;
        determining, by the security guard for each application, a plurality of security requirement rules, each security requirement rule based on a corresponding security annotation of the plurality of security annotations;
        evaluating, by the security guard for each application, compliance of such application with the plurality of security requirement rules; and
        implementing, based on the evaluated compliance for each application, one or more security implications, wherein each security implication is an executable interpretation of the corresponding security requirement rule,
        wherein the security guard belongs to an application layer of the in-memory database and cannot be circumvented by the application layer and wherein at least one of the security annotations comprises a defined data service channel.

12. The system according to claim 11, wherein, for each application, retrieving the plurality of security annotations occurs either upon authentication of the application, prior to a request by the application to access one or more resources on the server, or during the request by the application to access the one or more resources on the server.

13. The system according to claim 11, wherein the plurality of security requirement rules are encoded by the security guard prior to retrieving the plurality of security annotations.

14. The system according to claim 11, wherein the plurality of security requirement rules are loaded from the server upon initiation of the security guard and subsequently interpreted by the security guard.

15. The system according to claim 11, wherein the plurality of security annotations are each categorized as either fundamental security requirement rules evaluated on initiation of the application or variable security requirement rules evaluated each time the security guard evaluates compliance.

16. The system according to claim 11, wherein, for each application, implementing the security implication results in at least one of stopping the application, denying access of the application to the server, denying entity set access, denying access of the application to data of specific properties, denying the application read permissions, denying the application write permissions, denying the application modify permissions, and denying the application delete permissions.

17. The system according to claim 11, wherein each security annotation is based on static or dynamic metadata.

18. A non-transitory computer readable medium containing program instructions, which when executed by at least one data processor, result in operations comprising:
- retrieving, by a security guard, a plurality of security annotations associated with each of a plurality of applications from a server, wherein the security annotations differ for at least two of the applications;
- determining, by the security guard for each application, a plurality of security requirement rules, each security requirement rule based on a corresponding security annotation of the plurality of security annotations;
- evaluating, by the security guard for each application, compliance of such application with the plurality of security requirement rules; and
- implementing, based on the evaluated compliance for each application, one or more security implications, wherein each security implication is an executable interpretation of the corresponding security requirement rule,
- wherein the security guard belongs to an application layer and cannot be circumvented by the application layer and wherein at least one of the security annotations comprises a defined data service channel.

19. The method of claim 1, wherein modifications to one or more of the plurality of security annotations is made on the server.

20. The system of claim 11, wherein, for each application, the security annotations associated with the application are associated with at least one of a service level, an entity set level, or a property level.

* * * * *